United States Patent [19]
Akester et al.

[11] 3,877,392
[45] Apr. 15, 1975

[54] AUTOMATIC GATE LOCKING MECHANISM

[75] Inventors: Roger L. Akester, Saint Charles; Richard H. Dugge, Saint Louis; Wallace Lee Fossett, Weldon Spring Heights; Jerry D. Waddell, O'Fallon, all of Mo.

[73] Assignee: ACF Industries, Incorporated, New York, N.Y.

[22] Filed: Dec. 28, 1973

[21] Appl. No.: 429,466

[52] U.S. Cl............ 105/282 P; 105/308 P; 105/310; 105/313
[51] Int. Cl.......... B61d 7/20; B61d 7/22; B61d 7/26
[58] Field of Search............ 105/253, 282 A, 282 P, 105/282 R, 308 P, 308 R, 309, 310, 313

[56] References Cited
UNITED STATES PATENTS

| | | | |
|---|---|---|---|
| 2,638,060 | 5/1953 | Dorey | 105/282 P |
| 2,993,452 | 7/1961 | Dorey | 105/308 R X |
| 3,035,530 | 5/1962 | Meyers et al. | 106/282 R X |
| 3,396,675 | 8/1968 | Stevens | 105/282 P X |
| 3,532,062 | 10/1970 | Pulcrano | 105/282 P |
| 3,536,013 | 10/1970 | Nagy | 105/282 P |
| 3,596,611 | 8/1971 | Floehr | 105/282 A |
| 3,707,126 | 12/1972 | Nester | 105/282 P |

*Primary Examiner*—M. Henson Wood, Jr.
*Assistant Examiner*—Howard Beltran
*Attorney, Agent, or Firm*—Henry W. Cummings

[57] ABSTRACT

A gravity outlet suitable for hoppers is provided comprising a gate movable back and forth between open and closed positions. A locking shaft is mounted on the gate having handles on at least one side of the outlet and having a locking member preferably hook shaped mounted thereon. A locking lug and a keeper or tripping lug are affixed to the pans or frame structure of the outlet.

In order to open the gate the locking shaft is rotated to move the locking member to a pre-tripped position out of engagement with the keeper thus allowing the gate to move outwardly from the pans. As the gate travels toward the open position, the gripping lug trips the locking member into a tripped position where it rides to the open position with the gate. Appropriate means are provided to stop the gate in the full open position. During closing of the gate, a cam surface on the locking member travels up the keeper and then the locking member drops into the locked position automatically to maintain the gate in a closed and locked position. In one embodiment a pinion shaft having pinions thereon and at least one door bearing are affixed to the gate which carry the gate along a fixed rack. In another embodiment a rack is affixed to the gate which is driven by a rotatable but longitudinally fixed pinion and pinion shaft. In accordance with another embodiment of the present invention, the locking shaft is movable into an overcenter position to provide further assurance to maintain the gate in the closed position. In another embodiment a transversely extending elastomeric seal is affixed either to the gate pan or to the gate. In one embodiment the elastomeric seal maintains contact with the gate regardless of the gate position to facilitate sealing during unloading. In another embodiment the elastomeric seal is in contact with the gate pan only in the closed position. In accordance with another embodiment at the front of the gate, gate guides are provided to insure that the gate assumes and maintains a closed position in engagement with the front pan.

14 Claims, 17 Drawing Figures

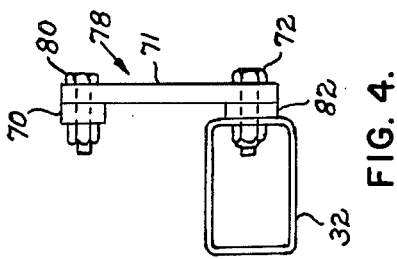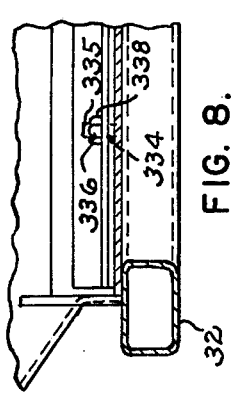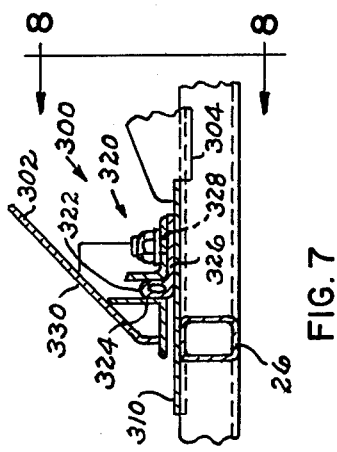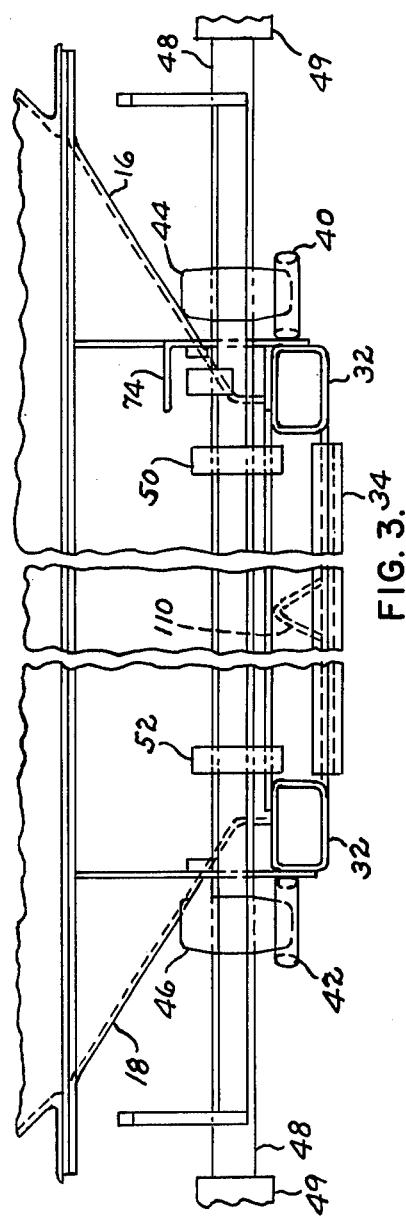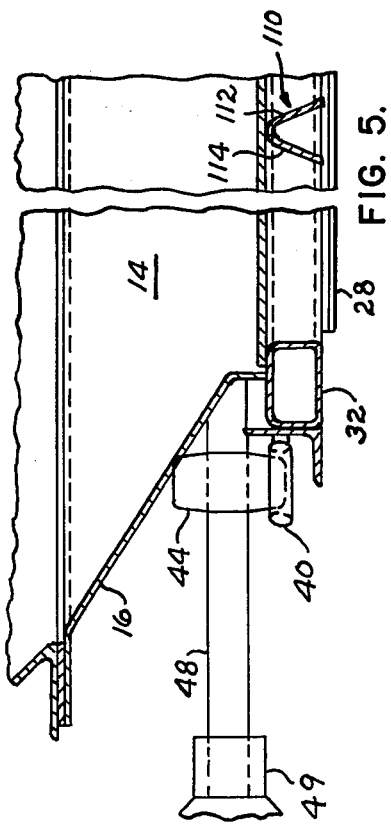

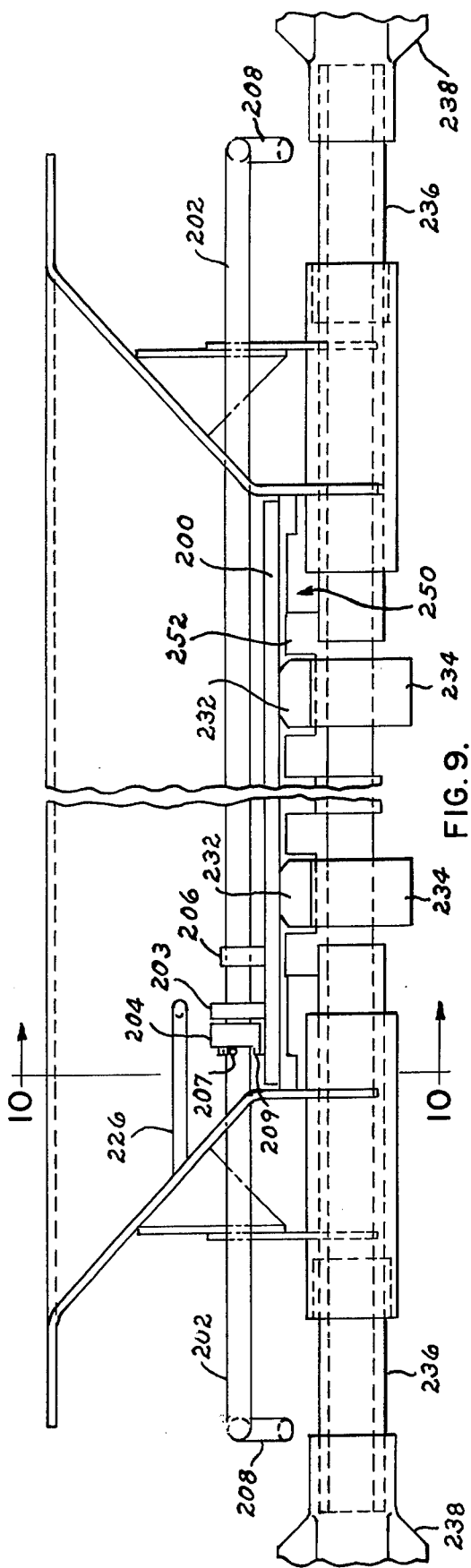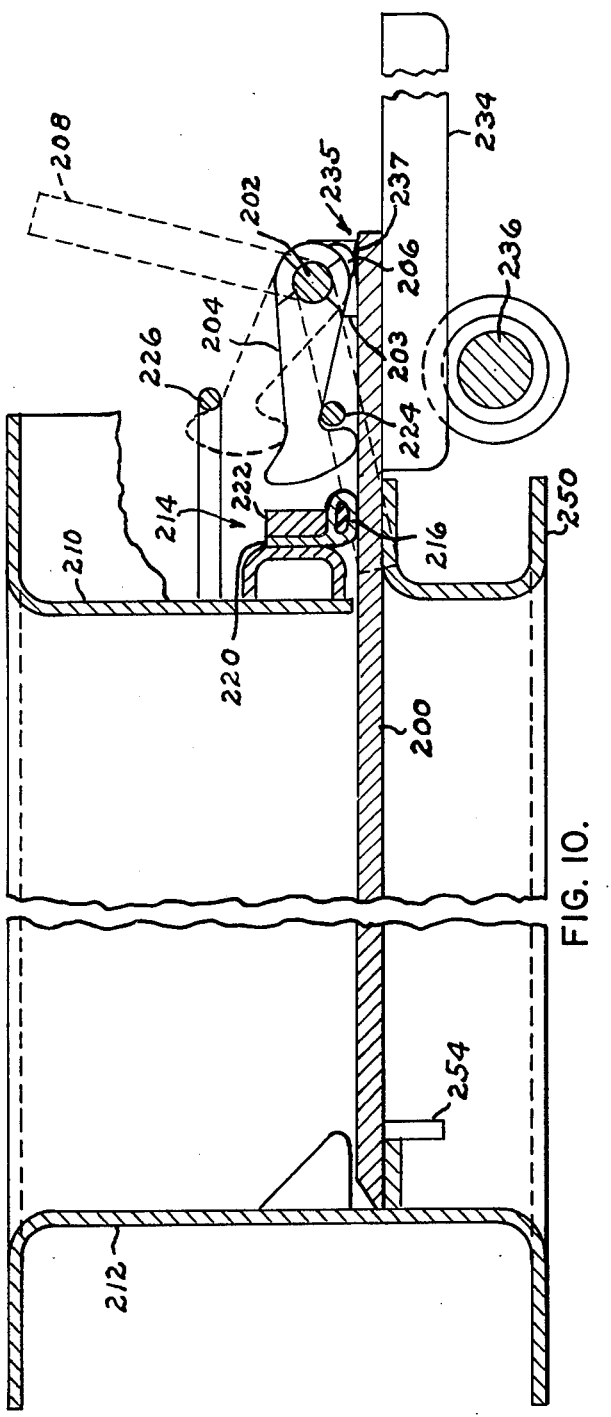

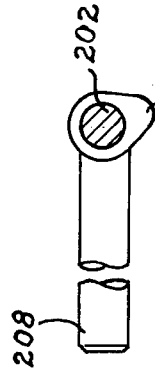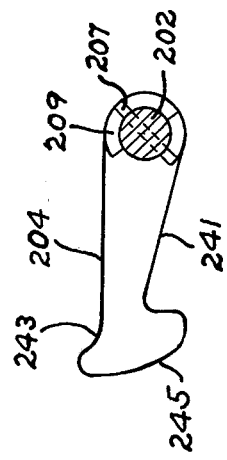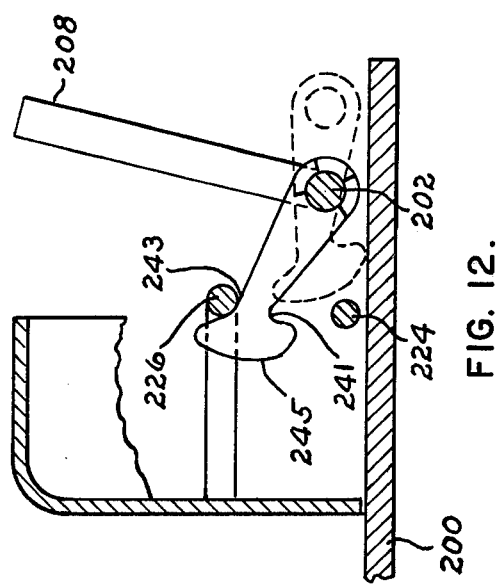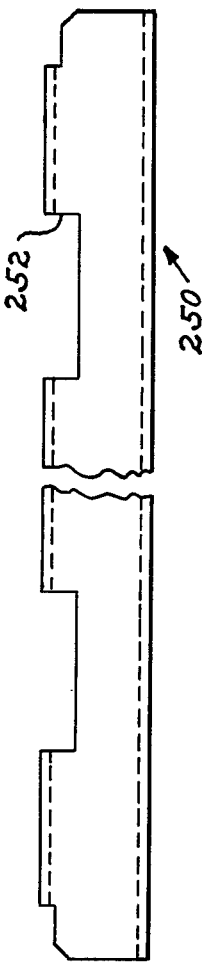

AUTOMATIC GATE LOCKING MECHANISM

BACKGROUND OF THE INVENTION

This invention relates to gravity outlets for railway hopper cars, hopper containers, hopper trucks and industrial bins.

One problem which has been encountered with regard to such outlets is their tendency to become partly open in transit and/or during coupling in railroad applications.

Another related problem is that of particulate, particularly freely flowing dry powder lading leaking from the outlets in transit and/or during coupling.

These problems have been of sufficient concern to the railraod industry that among the requirements of the recently passed AAR specification for gravity outlets for railroad use is that the gate automatically lock in the closed position in the event of impact.

In regard to lading leakage, another requirement of the specification is that the outlet be able to retain 50 gallons of water in a 3 minute leakage test. This test is used as an indicator of relative "tightness" since it is more severe than any dry lading service condition and very repeatable.

The present invention is an attempt to solve or at least materially reduce the magnitude and extent of these problems.

It therefore is an object of the present invention to provide a gravity outlet which becomes automatically locked upon being moved into the closed position.

Another object of the present invention is to provide a gravity outlet which will automatically move from an open or partly open position to a closed and locked position in the event of a deceleration or acceleration of the car equivalent to an 8 mile per hour impact or less.

It is another object of the present invention to provide a gravity outlet which in addition to becoming automatically locked upon closing can be further locked manually to provide even greater assurance against the gate opening in transit and/or under impact.

It is another object of the present invention to provide a gravity outlet having a seal sufficiently effective to avoid substantial leakage from the outlet.

Other objects will be apparent from the following description and drawings.

THE DRAWINGS

FIG. 2B is a sectional view along the lines 2B—2B in FIG. 1;

FIG. 3 is a sectional view along the lines 3—3 in FIG. 2;

FIG. 4 is a view along the lines 4—4 in FIG. 2;

FIG. 5 is a sectional view along the lines 5—5 in FIG. 2;

FIG. 6 is a detailed view of the seal member in relaxed condition; and FIG. 6A a detailed view of the seal holding bar;

FIG. 7 is a view of an alternate sealing arrangement;

FIG. 8 is a view of the alternate sealing arrangement along the lines 8—8 in FIG. 7;

FIG. 9 is a side elevation view of another embodiment of the present invention;

FIG. 10 is an end elevation of the embodiment of the invention shown in FIG. 9;

FIG. 11 is a detailed view of the stop member utilized in the embodiment shown in FIGS. 9 and 10;

FIG. 12 is a detailed view of the movement of the locking member and locking handle members during opening and closing of the gate;

FIG. 13 is a detailed view of the locking member illustrating an exemplary way of mounting the locking member for a desired amount of free rotation about the locking shaft; and FIG. 14 is a detailed view of the overcenter locking cam.

SUMMARY OF THE INVENTION

Figure 1:
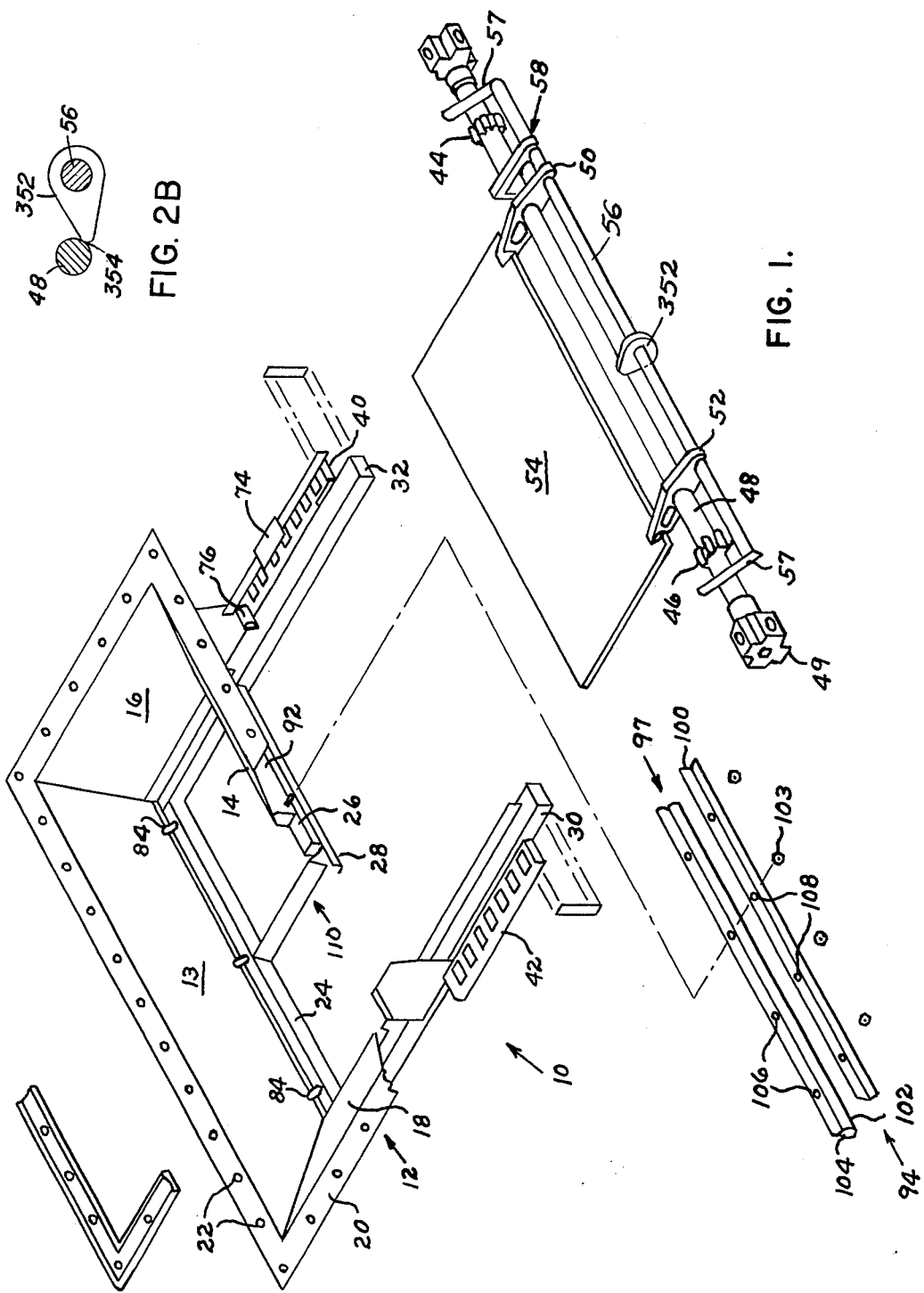
FIG. 1 is an exploded perspective view of the gravity outlet according to one embodiment of the present invention.

A gravity outlet suitable for use on railway hopper cars, overland hopper trucks, hopper type containers or industrial bins is provided comprising a gate movable back and forth between open and closed positions. A locking shaft is mounted on the gate having handles on at least one side of the outlet and having a locking member preferably hook shaped mounted thereon. A locking lug and a tripping lug or keeper are affixed to the fixed or frame structure of the outlet.

In order to open the gate the locking shaft is rotated to move the locking member to a pre-tripped position out of engagement with the locking lug, thus allowing the gate to move outwardly from the pans. As the gate travels towards the open position, the tripping lug trips the locking member into a tripped position where it rides to the open position with the gate. Appropriate means are provided to stop the gate in the full open position. During closing of the gate, a cam surface on the locking member cams up the locking lug or keeper and then the locking member drops into the locked position automatically to maintain the gate in a closed and locked position. In one embodiment a pinion shaft is affixed to the gate and having pinions thereon which carry the gate along a fixed rack. In another embodiment a rack is affixed to the gate which is driven by a rotatable but longitudinally fixed pinions and a pinion shaft. In accordance with another embodiment of the present invention, the locking shaft is movable into an overcenter position to provide further assurance to maintain the gate in the closed position. In another embodiment a transversely extending elastomeric seal is affixed either to the gate pan or to the gate. In one embodiment the elastomeric seal maintains contact with the gate regardless of the gate position to facilitate sealing during unloading. In another embodiment the elastomeric seal is in contact with the gate pan only in the closed position. In accordance with another embodiment at the front of the gate, gate guides are provided to insure that the gate assumes and maintains a closed position in the engagement with the front pan.

DETAILED DESCRIPTION

In one embodiment of the present invention in FIGS. 1–6, the gravity discharge outlet of the present invention is indicated generally at 10. The outlet may be used on railway hopper cars, hopper type transportion containers, overland hopper trucks or an industrial bins. The outlet is particularly adapted for use on a railway hopper car. The outlet has a pan section 12 comprising sloping walls 13, 14, 16 and 18. A peripheral flange 20 has openings therein 22 to allow affixing the outlet to an appropriate hopper. Front and rear gate supports 24 and 26 provided which may comprise, for example, a box section as shown in FIG. 2A. An unloading boot bracket 28 is preferably affixed to the rear gate support. Longitudinally extending gate supports 30 and 32 are also provided and as shown in FIG. 3, which also may be of the box section type. A boot attachment flange 34 is preferably affixed to each of the longitudinal gate supports.

Gate supports 30 and 32 extend outwardly on the opening side of the outlet. Transversely extending rack supports 36 are appropriately affixed, for example, by welding to the gate supports 30 and 32. Racks 40, 42 extend outwardly on rack supports 36 and are adapted to be engaged by pinions 44 and 46 which are affixed to a pinion shaft 48. Pinion shaft 48 has at least one and preferably two capstans 49, or other appropriate rotational energy receiving means. Shaft 48 is journaled in door bearings 50, 52 which are affixed by appropriate means, for example, welding, to gate 54. Also journaled within door bearings 50 and 52 is a locking shaft 56 having rigidly mounted thereon a locking member 58. Upon rotation of handles 57, locking lever may be moved from the position shown solid in FIG. 2A to the pre-tripped position shown dotted. Locking member 58 comprises a shaft portion 60 and a locking portion 62. Locking portion 62 also has a cam surface 64.

At least one pinion shaft retainer 70 is appropriately affixed to at least one of the longitudinally extending supports 32 and 34, for example, by means of a vertical extension 71 and mechanical fasteners or welding at 72. Affixed to the pinion shaft retainer 70 by appropriate fasteners or welds is lug 74 and keeper 76. A gate stop 78 is preferably affixed to pinion shaft retainer 70, for example, by means of nuts and bolts 80 or welding and a stop gate spacer 82, as shown in FIG. 4.

In order to ensure engagement of the gate in the closed position, a plurality of front gate guides 84 may be provided appropriately affixed to wall 13 of pan 12. The gate guides comprise a cam front portion 86 which may cooperate with a small taper 88 on the gate to ensure that the gate assumes a proper closed position. If desired, a similar taper 90 may be provided on the lower portion of the gate which cooperates with the curved contour on transverse support 24 to further facilitate the gate obtaining a properly closed position.

Gate sealing means indicated generally at 94 are provided. The gate sealing means may comprise a generally transversely extending support member or pan stiffener 92 which may have, for example, angle-shape which is affixed to the sloping pan 14, for example, by welding.

An elastomeric seal member is indicated generally at 97. As shown in FIG. 6 in the relaxed condition, elastomeric seal member 98 comprises a lower portion 102 which may have, for example a circular cross section and an upper mounting or stem portion 104 having a plurality of openings therein 106. Seal 98 is made of elastomeric material; any of the known elastomeric polymer or copolymers may be utilized. Examples include polyethylene, Polyurethane, polypropylene, polystryene, ethylene-propylene, copolymers, silicone rubber, etc. If desired the seal may have an integrally molded cover 103 on the exterior to reduce sliding friction. Seal 98 is held in place by appropriate fasteners, such as bar 100, a plurality of studs 96 affixed to stiffener 92 across the gate and nuts 105. As shown in FIG. 6A, Bar 100 has corresponding openings therein 108 which align with the studs 96 and openings 106 in seal member 98. It will be apparent to those skilled in the art that other mechanical fastening arrangements could be used.

As shown in FIG. 5, a center spill deflector 110 may be provided to facilitate the use of dual boots for single openings. The deflector directs the lading into the respective boots by means of the surfaces 112 and 114.

In operation, assuming the gate to be in the closed position, in order to open the same, handles 57 are utilized to rotate shaft 56 and move locking member 58 out of engagement with lug 76 into the pre-tripped position shown dotted in FIG. 2A. Then a capstan 49 is engaged by an appropriate bar, or other power source to rotate shaft 48 and move pinions 44 and 46 along racks 40 and 42. As pinion shaft 48 and door bearings 50 and 52 move from left to right in FIG. 2, the gate begins to open and tripping lug 74 trips locking member 58 into the tripped position wherein it rides upon pinion shaft 48 as the gate is opened. When the gate reaches its open most position, locking shaft 56 engages gate stop 78 as shown dotted in FIG. 2A.

In order to close the gate, the capstan 49 is rotated in the opposite direction to move shaft 48, pinions 44 and 46, and door bearings 50 and 52 to the left, with pinions 44 and 46 moving along racks 40 and 42. When the locking member 58 reaches the locking keeper 76, the cam surface 64 of locking member 58 moves up the keeper 76 and then drops into locked position when the locking surface 62 engages the locking keeper 76 to prevent the gate from moving out of the closed position.

Figure 2:
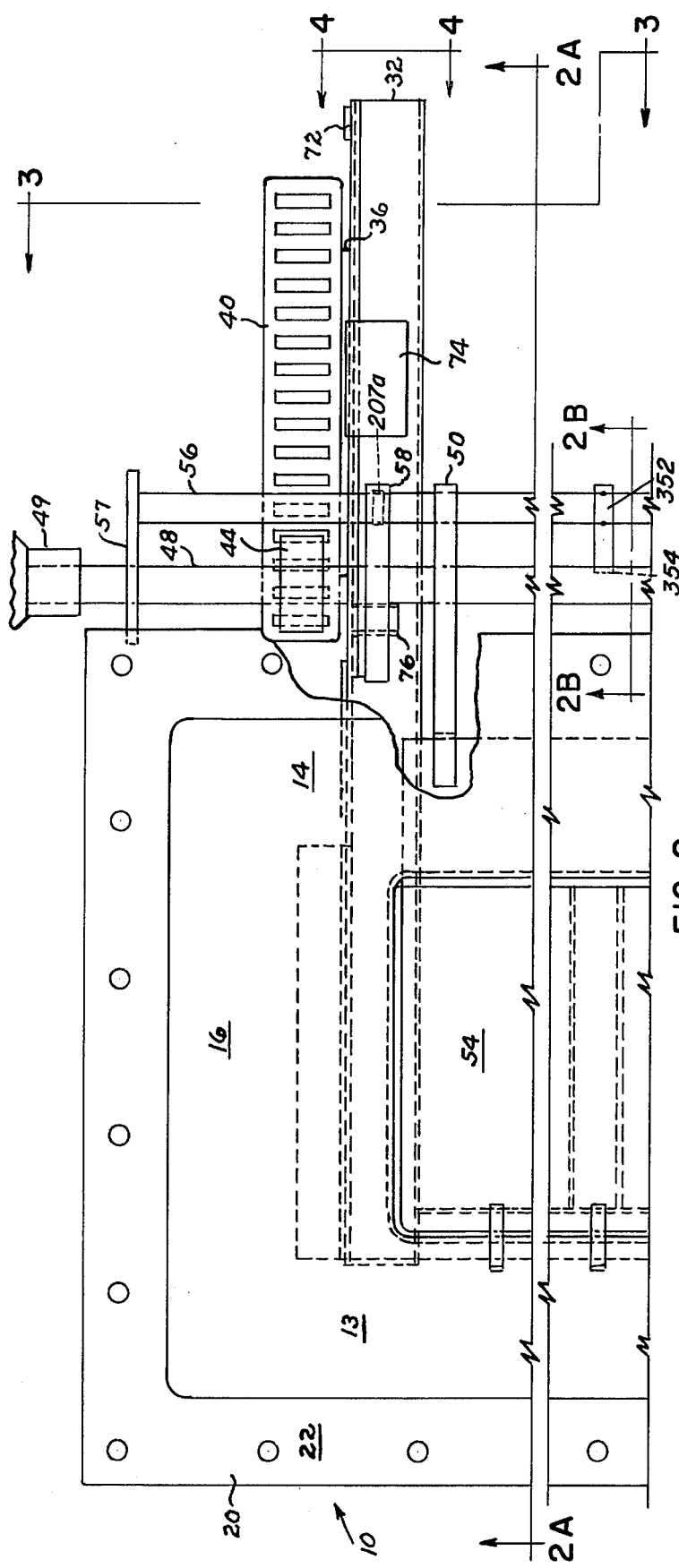
FIG. 2 is a top view of the embodiment of the gravity outlet of the present invention in FIG. 1.
Figure 2A:
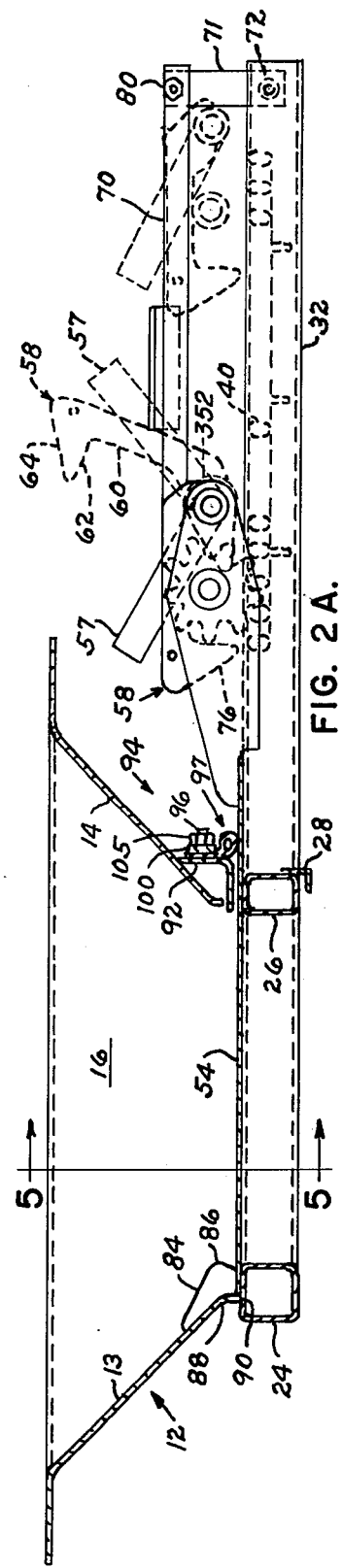
FIG. 2A is a sectional view along the lines 2A—2A in FIG. 2.

It will be apparent that if the car is impacted from the left in FIGS. 1 and 2 and the gate is in the open or partly open position, the impact will provide sufficient energy to drive the pinions 44 and 46 along racks 40 and 42 and locking lever 58 will be automatically cammed into the locked position in engagement with keeper 76, as required by the new AAR specifications.

The seal member 98 ensures that significant amounts of lading will not escape during transit and that the gate will be sealed transversely during opening and closing of the gate since the seal is at all times in contact with the upper surface of gate 54.

In the embodiment of the present invention shown in FIGS. 9 through 14 a locking shaft 202 is journalled in a bracket 203 mounted on gate 200. Shaft 202 has journalled thereon a locking member 204 for free rotation of from about 20 degrees to about 140 degrees, most preferably 60 degrees to 90 degrees, and an overcenter locking cam 206. This may be done for example, by means of a pin 207 provided through shaft 202 and a semicircular portion 209 of locking member 204. After lock member 204 has rotated the desired amount, pin 207 engages portion 209 and thereafter locking member 204 rotates with shaft 202. Shaft 202 also is provided with an operating handle 208. The gate further comprises front and rear outlet pan walls 210 and 212. Affixed to rear wall 210 is a resilient sealing device indicated generally at 214 which comprises an elastomeric member 216 having a steam portion 220 which is held in engagement with the gate by appropriate fasteners passing the support 222 and through resilient device 216 as described hereinbefore in connection with the embodiment of FIGS. 1–6. A transversely extending shaft 224 is affixed to the frame structure. Affixed to the frame structure, for example, to the gate pan 210 is a tripping device or lug 226.

Locking member 204 has a first engaging portion 241 preferably hook shaped which engages keeper shaft 224 in locked position and locking member 204 also has a second engaging portion 243 that engages during operation tripping lug 226. Locking member 204 also has a cam surface 245.

Gate 200 also has depending racks 232 which engage one or more pinions 234 mounted on a pinion shaft 236 which may be rotated by means of a capstan 238 in conventional fashion. Gate 200 also is provided into a locking contour 235, for example, a locking lug 237 which is adapted to cooperated with locking cam 206 as the latter assures an overcenter locked position when the gate is in the closed position.

A transversely extending fixed stop member 250 comprises vertically extending slots 252 and a generally U-shaped cross section. A gate stop member 254 is mounted on gate 200.

In the operation of the embodiment shown in FIGS. 9 and 13 assuming the gate is in the closed position, the locking shaft 202 is first rotated by means of handle 208 so that locking cam 206 is moved from the overcenter locked position. At the same time locking member 204 is moved out of engagement with transverse shaft 224 into the pre-tripped position shown dotted in FIG. 10. The gate is then moved outwardly by means of pinion shaft 236 and racks 232. As the gate moves outwardly, the locking member 204 engages tripping lug 226 and then drops to a tripped position riding along gate 200 as the gate proceeds to the open position.

In the opened position, racks 232 fit within fixed stop member 250 in slots 252. However, stop member 254 will not fit therein, therefore an effective stop means is provided in accordance with this construction.

When the gate is moved to the closed position by means of keeper shaft 236 cam surface 245 will move up shaft 224 and then assume the locked position with surface 241 engaging keeper shaft 224. In order to assume a completely locked position, locking handle 208 is manually rotated counterclockwise to move overcenter locking cam 206 into the overcenter locked position on locking lug 237 so that the gate cannot be removed. Instead of engaging a portion of gate 200 in the overcenter position, locking cam 206 could also be placed on shaft 202, so as to engage a fixed portion of the gate, for example, tripping lug 226 or bracket 203.

It will be apparent to those skilled in the art that the overcenter locking feature could also be used in the embodiment shown in FIGS. 1–6. For example, locking member 58 may be mounted upon locking shaft 56 for free rotation of from about 20 degrees to 140 degrees by means of pin 207a in the manner indicated in FIG. 13; after "and" a locking cam 352 mounted on shaft 56 and may be manually rotated to an overcenter position by means of handle 57, wherein locking cam 352 engages a cooperating contour 354 on shaft 48.

FIGS. 7 and 8 illustrate a sealing arrangement indicated generally at 300 which facilitates the gate automatically closing on low speed impact. In this embodiment, an outlet pan 302 is provided having affixed thereto, for example, by welding, a pan stiffener 304. Gate 310 has mounted thereon a sealing assembly indicated generally at 320. The sealing assembly comprises a gate seal 322 of the same general type as described hereinabove having a sealing portion 324 and a mounting or stem portion 326. Seal member 322 is mounted upon gate 310 by means of appropriate mechanical fasteners, for example, a retainer member 330 may be provided and appropriate fasteners 322 used which operate through openings 334 in the retainer member and openings 328 in the seal stem. A plurality of studs 335 are preferably appropriately affixed to gate 310, and are preferably threaded at 336. Nuts 338 are then utilized to hold retainer 330 and seal 320 in engagement with the gate during opening and closing movement. Other appropriate mechanical fasteners, such as, bolts or screws, could also be used to hold the retainer in place as will be apparent to those skilled in the art.

When the gate is in the closed position as shown in FIG. 8, the seal portion 324 engages the pan stiffener and the gate to provide an effective seal. However during opening and closing of the gate, the gate is carrying the seal and thus the drag of the seal upon the gate which the seal embodiment shown in FIGS. 1–6 encountered is avoided according to the construction shown in FIGS. 7 and 8.

What is claimed is:
1. A gravity outlet comprising:
   inclined downwardly extending pans defining a discharge opening; said outlet having longitudinally extending supports on opposite sides of said opening each having a longitudinally extending rack mounted thereon; a gravity gate longitudinally movable between a closed position closing said opening and an open position leaving said opening free for the discharge of lading; at least one door bearing affixed to said gate having journaled therein a pinion shaft; at least two pinions affixed to said pinion shaft and adapted to engage said racks; means for rotating said shaft to move said pinions along said racks and move said gate between open and closed positions; a locking shaft journaled in said door bearing and movable therewith, said locking shaft having a locking shaft longitudinal axis transverse to the direction of movement of said gate; a locking member affixed to said locking shaft; at least one tripping lug and at least one keeper affixed to at least one of said longitudinal supports; said tripping lug and said keeper extending transversealy with respect to the movement of said gate; means for rotating said locking shaft to move said locking member between a locked position and a pre-tripped position engaging said tripping lug; said tripping lug tripping said locking member from said pre-tripped position to a tripped position as said gate is moved outwardly from closed toward open position; said keeper having a contour which cooperates with a contour on said locking member whereby engagement of said keeper by said locking member causes said locking member to pivot about said locking shaft longitudinal axis until, as said gate moves into the closed position, said locking member automatically assumes the locked position, held in place by said keeper.

2. A gravity outlet according to claim 1 wherein said locking member is hook shaped.

3. A gravity outlet according to claim 1 wherein as said locking member pivots about said locking shaft longitudinal axis, said locking shaft rotates with respect to said door bearing.

4. A gravity outlet according to claim 1 wherein said keeper comprises a member extending at least part way across the width of said outlet.

5. A gravity outlet comprising: inclined downwardly extending pans defining a discharge opening; said outlet having longitudinally extending supports on opposite sides of said opening each having a longitudinally extending rack mounted thereon; a gravity gate longitudinally movable between a closed position closing said opening and an open position leaving said opening free for the discharge of lading; an elastomeric seal engaging at least one of said pans in compression fit when said gate is in closed position; at least one door bearing affixed to said gate having journaled therein a pinion shaft; at least two pinions affixed to said pinion shaft and adapted to engage said racks; means for rotating said shaft to move said pinions along said racks and move said gate between open and closed position; a locking shaft journaled in said door bearing and movable therewith, said locking shaft having a locking shaft longitudinal axis transverse to the direction of movement of said gate; a locking member affixed to said shaft; at least one tripping lug and at least one keeper affixed to at least one of said longitudinal supports; said tripping lug and said keeper extending transversely with respect to the movement of said gate; means for rotating said locking shaft to move said locking member between a locked position and a pre-tripped position engaging said tripping lug; said tripping lug tripping said locking member from said pre-tripped position to a tripped position as said gate is moved outwardly from said closed toward open position; said keeper having a contour which cooperates with a contour on said locking member whereby engagement of said keeper by said locking member causes said locking member to pivot about said locking shaft longitudinal axis until, as said gate moves into the closed position, said locking member automatically assumes the locked position, held in place by said keeper.

6. A gravity outlet according to claim 5 wherein said elastomeric member engages said gate as said gate moves between open and closed positions.

7. A gravity outlet according to claim 5 wherein at least one guide is affixed to a front transversely extending pan to guide said gate into closed position.

8. A gravity outlet according to claim 7 wherein a plurality of gate guides are provided.

9. A gravity outlet according to claim 5 wherein said outlet is provided with fixed and movable stop means.

10. A gravity outlet according to claim 9 wherein a fixed gate stop is affixed to said support and wherein said locking shaft engages said fixed gate stop in open position.

11. A gravity outlet according to claim 5 wherein said elastomeric seal is mounted upon said gate and engages one of said pans only when said gate is in closed position.

12. A gravity outlet comprising:

inclined downwardly extending pans defining a discharge opening; said outlet having longitudinally extending supports on opposite sides of said opening each having a longitudinally extending rack mounted thereon; a gravity gate longitudinally movable between a closed position closing said opening and an open position leaving said opening free for the discharge of lading; at least one door bearing affixed to said gate having journaled therein a pinion shaft; at least two pinions affixed to said pinion shaft and adapted to engage said racks; means for rotating said shaft to move said pinions along said racks and move said gate between open and closed positions; a locking shaft journaled in said door bearing and movable therewith, said locking shaft having a locking shaft longitudinal axis transverse to the direction of movement of said gate; a locking member affixed to said locking shaft to allow limited rotation of said locking shaft with respect to said locking member; at least one tripping lug and at least one keeper affixed to at least one of said longitudinal supports; said tripping lug and said keeper extending transversely with respect to the movement of said gate; means for rotating said locking shaft to move said locking member between a locked position and a pre-tripped position engaging said tripping lug; said tripping lug tripping said locking member from said pre-tripped position to a tripped position as said gate is moved outwardly from closed toward open position; said keeper having a contour which cooperates with a contour on said locking member whereby engagement of said keeper by said locking member causes said locking member to pivot about said locking shaft longitudinal axis until, as said gate moves into the closed position, said locking member automatically assumes the locked position, held in place by said keeper; and a locking lug integral with said locking shaft whereby said locking shaft, by virtue of said limited rotation of the locking shaft with respect to said locking member, may be moved into an overcenter locked position after said gate has assumed the closed position.

13. A gravity outlet according to claim 12 wherein said locking lug in the overcenter position engages the gate.

14. A gravity outlet according to claim 12 wherein said locking lug in the overcenter position engages the fixed frame structure.

\* \* \* \* \*